3,314,861
METHOD FOR SOLUBILIZING INSOLUBLE
COLLAGEN FIBERS
Tadahiko Fujii, 75 Kotake-cho, 2-chome, Nerima-ku,
Tokyo, Japan
No Drawing. Filed Nov. 18, 1965, Ser. No. 508,594
Claims priority, application Japan, May 11, 1963,
38/24,814; Mar. 18, 1964, 39/14,788
9 Claims. (Cl. 195—6)

This is a continuation-in-part of my copending patent application Ser. No. 365,197 filed May 5, 1964 and now abandoned.

The present invention relates to a method for solubilizing insoluble collagen. Collagen, as is well known, is the principal proteinaceous constituent of skins of all types. The present invention is concerned particularly with the insoluble collagens occurring in animal hides.

If fresh native collagen is immersed in aqueous solutions of salts, such as sodium chloride, or acids, such as hydrochloric acid, some portion thereof will dissolve. However, significant portions of the collagen will remain undissolved. From a commercial standpoint, it is desirable to have a method for solubilizing all of this collagen in such a form that it can be reconstituted in a fiber resembling native collagen.

The molecular structure of collagen has not been fully ascertained. It is believed that the molecular structure may be considered in a simplified form (for the purpose of this invention) as composed of two portions. One portion, the main part of the collagen molecule, is a macromolecule of a rigid rod-like character and having a three-chain helical configuration. The length of this main portion is in the range of 2700 A. to 3000 A. The second portion of the collagen molecule may be designated as the "end linkage," or "telopeptide group." This telopeptide group joins macromolecules not covalently, but successively in an end-to-end manner, thereby forming a polymeric string. The telopeptide linkage also is proteinaceous but it is believed to lack the highly-ordered characteristic of the main macromolecule.

In native collagen fibers, the polymeric strings of collagen macromolecules are in a staggered aggregate with the telopeptide groups of each polymer string being aligned approximately one-fourth of the way along the main portions of the macromolecules of adjacent polymer strings. Thus, the staggered aggregate yields electron micrograph patterns having a characteristic period of about ¼ of the length of the macromolecule, or between about 640 and 700 A.

The lateral inter-molecular forces holding together the aggregates of the macromolecular polymers of collagen have not been fully characterized. In general, it is believed that these forces involve side-chain interaction between adjacent macromolecules. In the case of the soluble collagens, the forces are of a sufficiently low strength that the macromolecule polymers may be dispersed in acid or salt solutions.

As is well known, native collagen is relatively immune from attack by most enzymes except under certain conditions. The sole significant exception is the enzyme collagenase which is capable of reducing collagen to polypeptides. However, denatured collagen (in which the chains of macromolecule have been randomly disordered) is subject to attack by the usual proteolytic enzymes. From these facts, it has been suggested that immunity to enzyme attack is conferred by the three-chain helical structure.

Studies on solutions of soluble collagen have indicated that the telopeptide groups extend beyond the helical macromolecule and, as mentioned, are believed to have a disordered structure. According to this theory, they should be liable to attack by the usual proteolytic enzymes (e.g. those other than collagenase). The theory has been confirmed by demonstrating that proteolytic enzymes such as trypsin and pepsin will partially digest the telopeptide groups of soluble collagen. The enzyme also exhibits a depolymerizing action. Collagen can be precipitated from the resultant digest showing that the monomeric macromolecular collagen helix has been unaffected by the enzyme digestion.

Despite the discoveries that the telopeptide groups of soluble collagen could be partially digested, similar digestion of insoluble collagen was achieved only with difficulty. This was believed to be attributable to the structure thereof.

The three constituent polypeptide chains of collagen are not cross-linked at first after its biosynthesis. By the time of biological maturation of soluble collagen, two or three of these chains are cross-linked intra-molecularly and covalently at the teleopeptide group. The insoluble collagen is further cross-linked. Thus, in the case of young calf-skin, two or more macromolecules of collagen are also inter-molecularly and covalently cross-linked at the telopeptide groups (thereby insolubilizing the soluble collagen having only intra-molecular cross-linking). With further biological aging (i.e. as the calf-skin becomes the steer hide of an adult animal) additional intra- and inter-molecular cross-linking takes place. It is believed that the enzyme digestion of the telopeptide groups of the insoluble collagen of steer hide is very slow (as compared with the analogous digestion of calf-skin) because of the additional cross-linking.

Some years ago it was found that under certain conditions insoluble collagen of calf-skin could be digested with the common proteolytic enzymes. More specifically, under acid conditions enzymes such as pepsin will attack the insoluble collagen of calf-skin and yield a clear solution. Native-type collagen fibers can be reconstituted from the digest. The enzyme digestion is analogous to the depolymerizing action of the usual proteolytic enzymes on the soluble collagens mentioned above.

At that time, it was believed that the solubilization of the native insoluble collagen of adult animals with the common proteolytic enzymes was difficult unless the collagen had been denatured. A method for achieving such digestion, however, is disclosed in my United States Patent No. 3,121,049, granted Feb. 11, 1964.

According to the present invention, a novel process for solubilizing insoluble collagens, especially the insoluble collagen of steer hide has now been discovered. This method results in a collagen solution in a single easy and rapid step from which collagen fibers resembling native collagen can be reconstituted by methods known in the art.

According to the present invention, it has been found that if the enzyme digestion is carried out in the presence of water soluble neutral salts of divalent metals, the salts having the property of solubilizing soluble nature collagen without enzyme treatment or in the presence of cationic surfactants, the telopeptide group is rendered liable to proteolytic attack, while at the same time the main portion of the collagen molecule retains its resistance to attack by the enzymes exhibiting activity with respect to the telopeptide group. Thereby it is possible to obtain a solubilized collagen which, by methods known in the art, is reconstitutable in the form of collagen fibers resembling native collagen.

Neutral salts which can be employed in the present invention are the water-soluble chlorides, sulfates or acetates of bivalent metals selected from the group consisting of calcium, magnesium, barium, strontium, zinc, cadmium and manganese. The foregoing salts may be used generally in concentrations between about 0.01 M and 1.5

M, although generally the minimum amount of the salt will be about 0.2 M. In the preferred embodiments, wherein the pH is greater than about 4.0, the molarity of the salt solution is approximately 0.4–0.5 M. Of the foregoing salts, the alkaline earth salts, and especially calcium salts, are preferred.

Soluble cationic surfactants which may be used in the present invention are the art-recognized cationic surfactants which have the property of solubilizing soluble native collagen without enzyme treatment. These are, in general, quaternary ammonium compounds containing from 1 to 3 hydrogen or lower alkyl radicals (i.e. containing from 1 to 3 carbon atoms) and from 1 to 3 long-chain alkyl, aryl and/or arylalkyl hydrocarbons containing from 6 to 20 carbon atoms. The quaternary ammonium nucleus may be a part of a pyridinium group. The anion portion of the quaternary compound may be any appropirate water-solubilizing anion. Halides, such as chlorides and bromides, sulfates and methane sulfates are especially common.

The foregoing cationic surfactants are characterized by the general formulas:

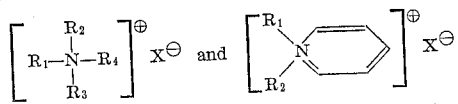

each of $R_1$, $R_2$, $R_3$ and $R_4$ being selected from the group consisting of hydrogen, lower alkyl radicals containing from 1 to 3 carbon atoms in the alkyl group, and long-chain alkyl, aryl, and arylalkyl hydrocarbons containing from 6 to 20 carbon atoms, there being in the cationic surfactant from 1 to 3 hydrogen and lower alkyl radicals, and from 1 to 3 long-chain alkyl, aryl and arylalkyl radicals and X is a water-solubilizing anion. Typical quaternary ammonium compounds include, but are not limited to dodecyl dimethyl ammonium chloride, dodecyl dimethyl benzyl ammonium chloride, and dodecylamine hydrochloride. A concentration of cationic surfactant between about 0.01 M and 0.1 M should be used. The preferred concentration of cationic surfactant is between about 0.02 M and about 0.05 M.

Any proteolytic enzyme capable of digesting the telopeptide group may be used in the practice of this invention, such enzymes being referred to, for convenience, as the telopeptidases. This class of enzymes may be considered as composed of all proteolytic enzymes other than collagenase. Examples of enzymes that can be used include, but are not limited to, pepsin, trypsin, ficin, bromelin and papain. Still other proteolytic enzymes can be obtained by cultivating micro-organisms. For this purpose, Bacillus subtillis, Streptomyces griseus, Streptomyces caespitocus, Aspergillus niger, Aspergillus saitoi, Aspergillus oryzae, Aspergillus niger van Tieghem, Trametes sanguinea and Paecilomyces varioti are all useful, the foregoing being representative only of the microorganisms which might be used. Still other enzymes are mentioned in the copending application of Ito and Kojima, Ser. No. 403,357 filed Oct. 12, 1964 and now abandoned.

As is well known in the art, the amount of enzyme required will vary widely depending upon the activity of the enzyme under the conditions of its use. It is contemplated, accordingly, that the amount of enzyme used will be sufficient to achieve the desired digestion. Smaller amounts of enzyme will, of course, lead to smaller digestion rates while higher amounts of enzyme will lead to faster digestion rates. In a normal, commercially practical process, the amount of enzyme required will be between about 0.01% and 5.0% based on the weight of the dry insoluble collagen initially used.

The enzymatic reaction may be carried out at any convenient temperature, but must be carried out at a temperature below the denaturation temperature of the collagen. Accordingly, temperatures in excess of about 35° C. should be avoided. Since the presence of the salt may effect the denaturation temperature, however, there may be cases where the permissable maximum temperature is even lower. Usually commercially useful enzyme activity is not obtained at temperatures below about 0° C.

The concentration of the collagen fibers before enzymatic digestion may be at any convenient level. It is preferred that the concentration of insolbule collagen in the salt solution be no more than about 100 grams/liter. Under these conditions, the enzyme treatment and the extraction of the solubilized collagen will occur substantially simultaneously.

The present invention is further illustrated by the following examples.

*Example 1*

The butt portion of a freshly slaughtered steer hide or steer hide trimmings which had been salted was washed with water after removal of hair. The grain layer and flesh side of the steer butt or trimmings were removed, and the portion rich in collagen was taken out as a raw material. The raw material thus obtained was washed again with water, immersed in a 10% aqueous saline solution and finally disintegrated into small pieces at a low temperature by the use of a mincer. The minced material was washed with 10% aqueous saline solution to remove proteins such as albumin, globulin and the like, and then fully washed with a 0.15 M citric acid solution to dissolve out any small amount of acid-soluble collagen contained in the material. The resulting material was thoroughly washed with water, dehydrated with alcohol, defatted with alcohol-ether (1:1) and dried. The dried material thus obtained was the so-called insoluble collagen. The insoluble collagen was used as the raw material in Examples 2 to 14 below.

*Example 2*

To 600 mg. of the insoluble collagen prepared in Example 1 was added 100 ml. of 0.5 M calcium chloride solution which had been adjusted to a pH of 6.2 with acetic acid. After the resulting mixture was left alone for about one hour, the enzyme produced from the *Streptomyces griseus* described in U.S. Patent No. 3,127,327 (available under the trademark Pronase-P) was added in an amount of 2% by weight of the dry collagen, and the mixture was subjected to moderate agitation at a temperature of 20° C. After two days of agitation, the mixture turned into a completely clear solution having a high viscosity. The clear solution was then filtered through a glass filter to remove the small amount of non-collagenous material remaining in the solution.

The filtrate thus obtained was dialyzed against the same buffer solution as that used in the solubilization of the collagen, with the result that the non-collagenous fraction decomposed by the enzyme was removed in an amount of from 5 to 10% by weight of the starting collagen. The tetrasodium salt of ethylenediamine tetraacetic acid was added to the collagen solution remaining after the dialysis in an amount equimolar to the calcium ion present. When the pH of said solution was adjusted to 7 to 8 with sodium phosphate, the collagen fiber was reconstituted with a yield of 100%. (In referring to recovery of 100% of the collagen here and in the following examples, reference is made to recovery of 100% of the portion of the collagen molecule having the characteristic collagen structure. In all cases there is a weight loss between the initial raw collagen and the recovered fibers of 5% to 10%, which is believed to represent the telopeptide end linkages which are digested.)

The same reconstitution could also be achieved if the filtrate of the solubilized collagen is dialyzsed or extruded through spinnerettes against water or 1% NaCl.

*Example 3*

To 6 grams of the insoluble collagen of steer hide prepared by the procedure described in Example 1 having a water content of about 18% by weight was added 100 ml. of an aqueous solution of 0.4 M calcium chloride which had been adjusted to a pH of 6.0 to 6.5 with acetic acid, and the resulting solution was allowed to stand for about one hour. Pronase-P was then added to this solution in an amount of 0.3% and then the solution was constantly agitated for three days while kept at a temperature of 20° C. At the end of this period, the insoluble collagen was almost completely solubilized. It can be reconstituted following the procedure outlined in Example 2.

Example 3 can be repeated replacing calcium chloride with a variety of other salts at the same concentration. The same results will be obtained. Salts which may be substituted for calcium chloride in Example 3 are:

calcium acetate
magnesium chloride
magnesium sulfate
magnesium acetate
barium chloride
strontium chloride
strontium acetate
zinc chloride
zinc sulfate
zinc acetate
cadmium chloride
cadmium sulfate
cadmium acetate
manganous chloride
manganous sulfate
manganous acetate Because the enzyme Pronase-P is activated only by strontium or calcium ions (and preferably by calcium) it is necessary in each case to maintain a $Ca^{++}$ concentration of about 0.05 M in the reaction mass.

*Example 4*

The procedure described in Example 2 was followed using the enzyme produced from *Bacillus subtillus*, (available under the trademark "Alkali-Protease") in an amount of 2%. The enzyme digestion was carried out in a 0.5 M calcium chloride solution adjusted to a pH of 7.0–7.5 with acetic acid.

The insoluble collagen was completely solubilized after two days.

*Example 5*

The procedure described in Example 3 was followed using Alkali-Protease as the enzyme in an amount of 0.3% in place of Pronase-P. In this example, the pH of the 0.4 M calcium chloride solution was adjusted to 7.0 which is the optimum pH for the enzyme. The insoluble collagen was almost completely solubilized after three days.

As mentioned at the close of Example 3 a variety of other salts can be substituted for calcium chloride.

*Example 6*

In this example, Pronase-P and magnesium chloride as the main neutral salt were used. A small amount of calcium chloride was also added as the stabilizer for Pronase-P. The concentration of calcium chloride was 0.05 M and that of magnesium chloride 0.45 M. Solubilization was carried out under the same conditions as those described in Example 2. The amount of enzyme required to obtain a clear solution within two days was 3%.

*Example 7*

To 600 mg. of the insoluble collagen prepared by the procedure described in Example 1 was added 100 ml. of an aqueous solution of 0.4 M calcuim chloride which had been adjusted to a pH of 6.5 with acetic acid. The resulting solution was then left alone for about one hour at a temperature of 20° C. The purified enzyme obtained by cultivating *Streptomyces caespitocus* (described in Japanese patent application No. 37/35,301) was then added to the solution in an amount of 1.0%, and the solution was mildly agitated for three days.

At the end of this period, the insoluble collagen was completely solubilized to give a highly viscous solution. The solution was then filtered through a glass filter to remove the small amount of non-collagenous material remaining in the solution. Fibrous collagen could be reconstituted following the procedure outlined in Example 2.

*Example 8*

The procedure outlined in Example 2 was repeated substituting a solution containing 0.4% dodecylamine for the calcuim chloride solution employed in Example 2. The dodecylamine was acidified with acetic acid to a pH of approximately 6.2. For the reason mentioned in Example 4, the digestion medium contained calcium chloride in a concentration of 0.05 M in addition to the dodecylamine.

*Example 9*

The procedure described in Example 8 was followed using dodecyl dimethyl benzyl ammonium chloride in an amount of 1.0% in place of dodecylamine. Pronase-P was used in an amount of 4% to 5%, and a 0.05 M calcium chloride solution adjusted with the acetic acid to a pH of 6 to 6.5 was used. After agitating for three days, the insoluble collagen was almost completely solubilized.

*Example 10*

A solution of calcium chloride in a concentration of 0.4 M was prepared. This solution additionally contained pyridine in a concentration of 0.09 M and cysteine in a concentration of 1 mM. Acetic acid was then added to adjust the pH of the solution to 4.0 to 6.0. 100 ml. of the insoluble collagen was then added to the 600 mg. of the insoluble collagen of the steer hide prepared by the procedure in Example 1. The resulting solution was left alone for about one hour. Papain was added to the solution in an amount of 5%, and the solution was gently agitated for two days while kept at a temperature of 20° C.

At the end of this period, the insoluble collagen was completely solubilized to show a clear highly viscous solution. Fibrous collagen can be reconstituted from the solution following the procedure of Example 2.

In contrast, when the solubilization of the insoluble collagen was carried out without using calcium chloride in the above procedure, only 50% by weight of the insoluble collagen initially used was solubilized.

*Example 11*

The procedure described in Example 10 was followed using ficin in anamount of 5% in place of papain. The insoluble collagen was completely solubilized after two days.

*Example 12*

The procedure described in Example 10 was followed using bromelin in an amount of 5% in place of papain. The insoluble collagen was completely solubilized after two days.

*Example 13*

Solubilization was carried out in the following procedure by use of pepsin, which is a typical proteolytic enzyme having activity in the acid pH range.

To 500 mg. of the insoluble collagen prepared in Example 1 was added 100 ml. of 0.01 N hydrochloric acid solution having a pH of 2.0 and containing 0.01 M calcium chloride. After the resulting mixture was left alone for about one hour, pepsin (obtained from Nutritional Biochemical Corporation, 3×cryst.) was added in an amount of 2% by weight of the collagen used, and the mixture was subjected to moderate agitation at a temperature of 20° C. After 48 hours of agitation, 100% of the collagen was solubilized.

This solubilization can also be carried out by use of magnesium chloride, strontium chloride or barium chloride in place of calcium chloride. The same results are obtained. On the other hand, when the solubilization was carried out without calcium chloride or one of the other neutral salts given before, only 60% of the collagen was solubilized after 48 hours of agitation. From this fact, it will be seen that while collagen can be solubilized by pepsin in acid solutions, the rate of solubilization of the collagen is significantly promoted by the addition of calcium chloride or other neutral salt.

*Example 14*

Example 13 was repeated employing a 0.4% solution of dodecylamine in place of the calcium chloride solution. The dodecylamine was acidified to a pH of 3.0 employing acetic acid. After adding the enzyme, the digestion mass was agitated for 48 hours. 100% of the collagen was solubilized.

When the solubilization process of this example is carried out in the absence of dodecylamine, only 60% of the collagen is solubilized after 48 hours.

From the foregoing examples, it will be understood that collagen previously considered difficult to solubilize can be easily solubilized with the procedures of the present invention.

To ascertain the characteristics of solubilized collagen prepared in accordance with the precent invention, the filtrate obtained in Examples 2 through 14 was dialyzed against 0.01 N in acetic acids and measurements were made of the specific optical rotatory power, viscosity, flow birefrigence and sedimentation constant of the dialysate. Almost the same values were observed as those of a solution obtained by conventional methods, for example, by treating acid-soluble collagen with pepsin in the absence of a neutral bivalent salt or cationic surfactant. These results indicate that the insoluble collagen fibers can be converted into a collagen which exhibits the same properties as monomeric acid-soluble collagen. From the resulting solution obtained by the above method, collagen fibers can, of course, be reconstituted by conventional methods with a yield of 100%. Electron microscopic study demonstrates that the collagen fibers obtained with the procedures of the present invention have a striated structure having a period of about 640 A.–700 A. and are the same as native collagen fibers.

Ultracentrifuge study on the denatured state of the collagen obtained shows that the enzymes digest the telopeptide groups, in which covalent inter- and intra-molecular crosslinks exist, and that the collagen molecules consist of almost non-crosslinked three polypeptide chains.

From the collagen solution thus obtained, preparations of film, yarn, textile, sponge, sheet, casing of collagen and the like can be prepared. After desalting and inactivating the enzyme, if the suspension of reconstituted collagen in water is heated to a temperature of 40° to 70° C., gelatin can be made in an extremely short period of time in comparison with other conventional methods of making gelatin.

The invention has been described in detail with particular reference to preferred embodiments thereof, but it will be understood that variations and modifications can be effected within the spirit and scope of the invention as described hereinabove and as defined in the appended claims.

I claim:

1. A method for converting insoluble collagen into a fiber reconstitutable form in an aqueous solution which comprises treating insoluble collagen with a proteolytic enzyme other than collagenase which will hydrolyze the telopeptide group of collagen and which is active in a pH range of about 2 to 10 in the presence of an aqueous solution of at least one water-soluble cationic surfactant selected from the group consisting of

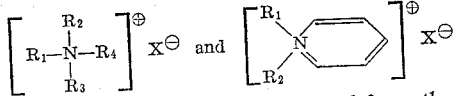

each of $R_1$, $R_2$, $R_3$ and $R_4$ being selected from the group consisting of hydrogen, lower alkyl radicals containing from 1 to 3 carbon atoms in the alkyl group, and long-chain alkyl, aryl, and arylalkyl hydrocarbons containing from 6 to 20 carbon atoms, there being in said cationic surfactant from 1 to 3 hydrogen and lower alkyl radicals, and from 1 to 3 long-chain alkyl, aryl and arylalkyl radicals and X is a water-solubilizing anion, said cationic surfactant being present in a concentration between about 0.01 M and 0.1 M, said reaction being carried out at a pH between about 2 and 10 at which said enzyme is active and at a temperature below the denaturing temperature of said collagen.

2. A method for converting insoluble collagen into a fiber reconstitutable form in an aqueous solution which comprises treating insoluble collagen with a proteolytic enzyme other than collagenase which will hydrolyze the enzyme other than collagenase which will hydrolyze the telopeptide group of collagen and which is active in pH range of about 2 to 10 in the presence of an aqueous solution of at least one water-soluble divalent metal sale of a metal selected from the group consisting of calcium, magnesium, barium, strontium, zinc, cadmium, and manganese with an acid selected from the group consisting of hydrochloric, sulfuric and acetic acid, said divalent metal salt having a concentration between about 0.01 and 1.5 molar, said reaction being carried out at a pH, between about 2 and 10, at which said enzyme is active and at a temperature below the denaturing temperature of the collagen.

3. A method for converting insoluble collagen into a fiber reconstitutable form in an aqueous solution which comprises treating an insoluble collagen with a proteolytic enzyme selected from the group consisting of trypsin, pepsin, ficin, bromelin, papain and proteolytic enzymes other than collagenase which will hydrolyze the telopeptide group of collagen and which are produced by microorganisms selected from the group consisting of *Bacillus subtilies, Streptomyces griseus, Streptomyces caespitocus, Aspergillus niger, Aspergillus saitoi, Aspergillus oryzae, Aspergillus niger van Tieghem, Trametes sanguinea* and *Paecilomyces varioti*, the maximum activity of said enzyme occurring at a pH between about 2 and about 10, in the presence of an aqueous solution consisting of at least one compound selected from the group consisting of cationic surfactants and which have a formula selected from the group consisting of

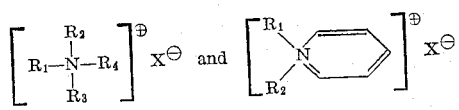

each of $R_1$, $R_2$, $R_3$ and $R_4$ being selected from the group consisting of hydrogen, lower alkyl radicals containing from 1 to 3 carbon atoms in the alkyl group, and long-chain alkyl, aryl, and arylalkyl hydrocarbons containing from 6 to 20 carbon atoms, there being in said cationic surfanctants from 1 to 3 hydrogen and lower alkyl radicals, and from 1 to 3 long-chain alkyl, aryl and arylalkyl radicals and X is a water-solubilizing anion, and water-soluble divalent metal salts of metals selected from the group consisting of calcium, magnesium, barium, strontium, zinc, cadmium, and manganese with an acid selected from the group consisting of hydrochloric, sulfuric and acetic acid, the concentration of said cationic surfactant, when present, being between about 0.01 M and 0.1 M by weight and the concentration of said salt, when present, being between about 0.01 M and 1.5 M, said reaction being carried out at a pH between about 2 and about 10 at which said enzyme is active and at a temperature below the denaturing temperature of the collagen.

4. A process according to claim 3, wherein said enzyme is the enzyme produced by *Bacillus subtilis*.

5. A process according to claim 3, wherein said enzyme is produced by *Streptomyces griseus*.

6. A process according to claim 3, wherein said enzyme is pepsin.

7. A process according to claim 3, wherein the enzyme digestion is carried out in a solution of calcium chloride.

8. A process according to claim 3, wherein the concentration of the neutral salt in the digestion medium is between about 0.4 M and about 0.5 M.

9. A process according to claim 3, wherein the concentration of the cationic surfactant in the digestion medium is between about 0.02 M and 0.05 M.

References Cited by the Examiner

UNITED STATES PATENTS 3,121,049   2/1964   Nishikara _____ 195—6

A. LOUIS MONACELL, *Primary Examiner.*

ALVIN E. TANENHOLTZ, *Examiner.*